United States Patent
Ito et al.

(10) Patent No.: US 11,233,907 B1
(45) Date of Patent: Jan. 25, 2022

(54) IMAGE FORMING APPARATUS WITH OUPUT OF IMAGE DATA FROM MEMORY DEPENDING ON ELAPSING OF PREDICTION TIME AFTER DOCUMENT LEADING EDGE PASSES SENSOR

(71) Applicant: TOSHIBA TEC KABUSHIKI KAISHA, Tokyo (JP)

(72) Inventors: Takeshi Ito, Mishima Shizuoka (JP); Ryuuta Imaizumi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/178,837

(22) Filed: Feb. 18, 2021

(51) Int. Cl.
  *H04N 1/00* (2006.01)
  *H04N 1/12* (2006.01)
  *H04N 1/047* (2006.01)
  *H04N 1/32* (2006.01)

(52) U.S. Cl.
  CPC ....... *H04N 1/00082* (2013.01); *H04N 1/0009* (2013.01); *H04N 1/00018* (2013.01); *H04N 1/00037* (2013.01); *H04N 1/00068* (2013.01); *H04N 1/00076* (2013.01); *H04N 1/00687* (2013.01); *H04N 1/00734* (2013.01); *H04N 1/00745* (2013.01); *H04N 1/00766* (2013.01); *H04N 1/00771* (2013.01); *H04N 1/00774* (2013.01); *H04N 1/047* (2013.01); *H04N 1/1215* (2013.01); *H04N 1/3263* (2013.01)

(58) Field of Classification Search
  CPC ........... H04N 1/00018; H04N 1/00037; H04N 1/00076; H04N 1/00068; H04N 1/00082; H04N 1/0009; H04N 1/000687; H04N 1/00734; H04N 1/00745; H04N 1/00766; H04N 1/00771; H04N 1/00774; H04N 1/047; H04N 1/1215; H04N 1/3263
  See application file for complete search history.

(56) References Cited

U.S. PATENT DOCUMENTS

| | | | |
|---|---|---|---|
| 8,355,187 B2 * | 1/2013 | Matsui | H04N 1/00047 358/488 |
| 8,949,039 B2 * | 2/2015 | Yasukawa | B65H 5/062 702/34 |
| 2018/0183968 A1 | 6/2018 | Furukawa et al. | |

FOREIGN PATENT DOCUMENTS

| JP | 2016160011 A | * | 9/2016 |
|---|---|---|---|
| JP | 2018036525 A | | 3/2018 |
| JP | 2020028012 A | | 2/2020 |

* cited by examiner

*Primary Examiner* — Scott A Rogers
(74) *Attorney, Agent, or Firm* — Kim & Stewart LLP (57) ABSTRACT

According to one embodiment, an image forming apparatus includes a conveyance mechanism, a scanner, a buffer memory, a passage sensor, and a controller. The conveyance mechanism conveys a document along a conveyance path. The scanner reads an image on the document at a reading position along the conveyance path and generates image signals corresponding to the image that is read. The buffer memory stores image data corresponding to the image signals. The passage sensor is on the conveyance path upstream of the reading position. The controller determines whether to output the image data from the buffer memory after a sheet passage prediction time elapses based on the length of time required during a normal operation for the trailing edge of the document to reach the reading position.

20 Claims, 5 Drawing Sheets

IMAGE FORMING APPARATUS WITH OUPUT OF IMAGE DATA FROM MEMORY DEPENDING ON ELAPSING OF PREDICTION TIME AFTER DOCUMENT LEADING EDGE PASSES SENSOR

FIELD

Embodiments described herein relate to an image forming apparatus.

BACKGROUND

An image forming apparatus including an automatic document feeder (ADF) and a scanner is known. The image forming apparatus prints sheets of paper or the like based on a printing request and outputs printed sheets. The automatic document feeder conveys documents comprising multiple printed sheets sheet-by-sheet past a reading position of a scanner. The scanner optically reads the sheets conveyed by the document feeder and outputs image signals corresponding to the sheets.

The automatic document feeder includes a passage sensor. The passage sensor detects the passage of the sheets of the document along a conveyance path upstream of a reading position of the scanner, that is, portion of the conveyance path from insertion port of the document to reading position. The document feeder is thus able to detect when document sheet is not properly conveyed but stays or becomes stuck (jammed) along the conveyance path of the document feeder. That is, the occurrence of a feeding jam or the like can be detected by the passage sensor.

If a jam occurs, the image signal output from the scanner becomes abnormal. Therefore, the image forming apparatus must determine whether image data generated based on an image signal is corresponding to when the jam was detected. The image forming apparatus performs control so that the image data is not output if a jam is detected and is output if no jam is detected.

However, there can be a problem in that it is possible that image data generated based on an abnormal image signal has already been output before the jam is detected.

DETAILED DESCRIPTION

In general, according to one embodiment, an image forming apparatus includes a conveyance mechanism, a scanner, a buffer memory, a passage sensor, and a controller. The conveyance mechanism is configured to convey a document along a conveyance path. The scanner is configured to read an image on the document at a reading position along the conveyance path and generate image signals corresponding to the image. The buffer memory is configured to store image data corresponding to the image signals from the scanner. The passage sensor is on the conveyance path, upstream of the reading position, and configured to detect the passage of the document. The controller is configured to determine whether to output the image data from the buffer memory after the elapsing of a passage prediction time after the leading edge of the document is detected by the passage sensor, the passage prediction time being based on a length of time required in a normal operation for the trailing edge of the document to reach the reading position after the leading edge of the document reaches the passage sensor.

Hereinafter, certain, non-limiting example embodiments of an image forming apparatus, a control method, and a computer-readable non-volatile recording medium on which a control program is recorded are described with reference to the drawings.

Figure 1:
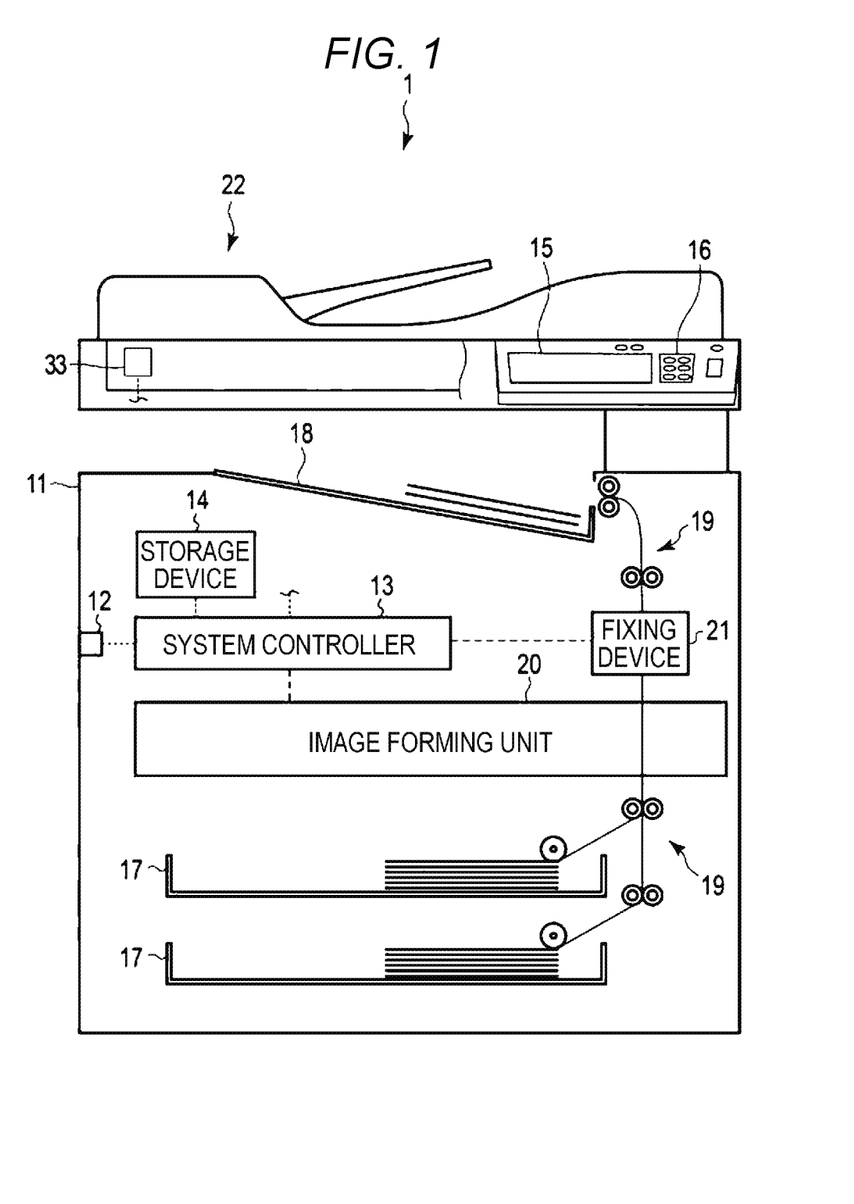
FIG. 1 depicts an image forming apparatus according to an embodiment.

FIG. 1 is a schematic diagram of an image forming apparatus according to an embodiment.

The image forming apparatus 1 is, for example, a multi-function peripheral (MFP) apparatus that performs various processes such as image formation (printing) on recording media, such as sheets of paper or the like. The MFP apparatus may also have copier, scanner, and/or fax transmission functions, amongst others.

The image forming apparatus 1 uses a toner supplied from the toner cartridge in the image formation operations. The image forming apparatus 1 is, for example, a solid-state scanning printer that scans using an LED array. Such an image forming apparatus 1 may be referred to as a LED printer. In other examples, the image forming apparatus 1 may be an inkjet printer with an inkjet head that discharges ink, or may be another type of printer.

The image forming apparatus 1 is able to optically read (scan) patterns such as characters and illustrations printed on a document.

As illustrated in FIG. 1, the image forming apparatus 1 includes a housing 11, a communication interface 12, a system controller 13, a storage device 14, a display unit 15, an operation interface 16, a paper feeding cassette 17, a paper discharging tray 18, a conveyance mechanism 19, an image forming unit 20, a fixing device 21, and an image reading unit 22.

The housing 11 is the main body of the image forming apparatus 1. The housing 11 contains therein the communication interface 12, the system controller 13, the storage device 14, the display unit 15, the operation interface 16, the paper feeding cassette 17, the paper discharging tray 18, the conveyance mechanism 19, the image forming unit 20, the fixing device 21, and the image reading unit 22.

The communication interface 12 provides communication with other devices. The communication interface 12 is used, for example, for communication with a client terminal or the like. The client terminal is an information processing device such as a personal computer, a smartphone, or a tablet PC. The communication interface 12 is configured as, for example, a local area network (LAN) connector. The communication interface 12 may also or instead be configured to perform wireless communication with the client terminal according to a wireless communication standard such as Bluetooth® or Wi-Fi®.

The system controller 13 control operations of the image forming apparatus 1. The system controller 13 controls the transmission and reception of data by the communication interface 12, the screens displayed by the display unit 15, the handling of operation inputs received via the operation interface 16, the conveyance of a recording medium by the conveyance mechanism 19, the image forming process of the image forming unit 20, the fixing process of the fixing device 21, and the image reading process of the image reading unit 22.

The storage device 14 is a rewritable, non-volatile memory. For example, the storage device 14 is a solid-state drive (SSD), a hard disk drive (HDD), or the like. The storage device 14 stores data used in various processes, data generated by various processes, and the like. For example, the storage device 14 stores a file of image data generated by scanning a document.

The display unit 15 includes a display device that displays screens or images in response to a video signal input from a display control unit, such as the system controller 13 or, in some examples, a graphics controller. For example, the display unit 15 displays screens permitting a user to input various settings for the image forming apparatus 1 such as printer instructions, print parameters, and the like.

The operation interface 16 generates an operation signal based on the input operations (e.g., selections) of the user. The operation interface 16 can include such things as keypads, keyboards, touch screens, pointing devices, dedicated buttons, switches, and the like.

The paper feeding cassettes 17 contain recording media (e.g., sheets of paper). The paper feeding cassettes 17 are generally removable from the housing 11 so that the paper feeding cassettes 17 can be filled or refilled with paper. When a plurality of paper feeding cassettes 17 are provided, each can contain paper of different sizes or types, for example.

The paper discharging tray 18 is a tray that supports sheets of paper discharged from the image forming apparatus 1 after printing or the like.

The conveyance mechanism 19 supplies a recording medium to the image forming unit 20. The conveyance mechanism 19 can supply sheets of paper one by one from a paper feeding cassette 17 for printing. The conveyance mechanism 19 discharges printed sheets to the paper discharging tray 18.

The image forming unit 20 forms an image on the recording medium based on the control of the system controller 13. The image forming unit 20 in this example includes a photosensitive drum, an electrostatic charger, a latent image developing device, an exposure device, and a toner image transfer mechanism. When the surface of the photosensitive drum has been charged by the electrostatic charger then selectively irradiated with light from the exposure device according to image data, an electrostatic latent image is formed on the surface of the photosensitive drum. A corresponding toner image is then formed on the surface of the photosensitive drum by toner from the developing device adhering to the electrostatic latent image.

The transfer mechanism is configured to transfer the toner image from the surface of the photosensitive drum to the recording medium. The transfer mechanism receives the toner image from the surface of the photosensitive drum and then transfers this toner image to a recording medium supplied by the conveyance mechanism 19.

The fixing device 21 is configured to fix the toner image to the recording medium. The fixing device 21 includes a heating member that applies heat to the recording medium, a pressing member that applies pressure to the recording medium, and a heater. The heating member is, for example, a heat roller. The pressing member is, for example, a press roller. The heater heats the heating member. A fixing nip is formed between the press roller and the heat roller. In general, the press roller presses against the heat roller. The fixing device 21 applies heat and pressure to the recording medium by passing the recording medium through the fixing nip. Accordingly, the fixing device 21 fixes the toner image to the recording medium with heat and pressure. The recording medium that passes through the fixing nip is subsequently discharged to the paper discharging tray 18 by the conveyance mechanism 19.

The fixing device 21 is not limited to the above configuration. The fixing device 21 may be configured as an on-demand type in which the heat is applied to the recording medium via a film-like member.

The image reading unit 22 is configured to scan a document and generate an image signal accordingly.

Figure 2:
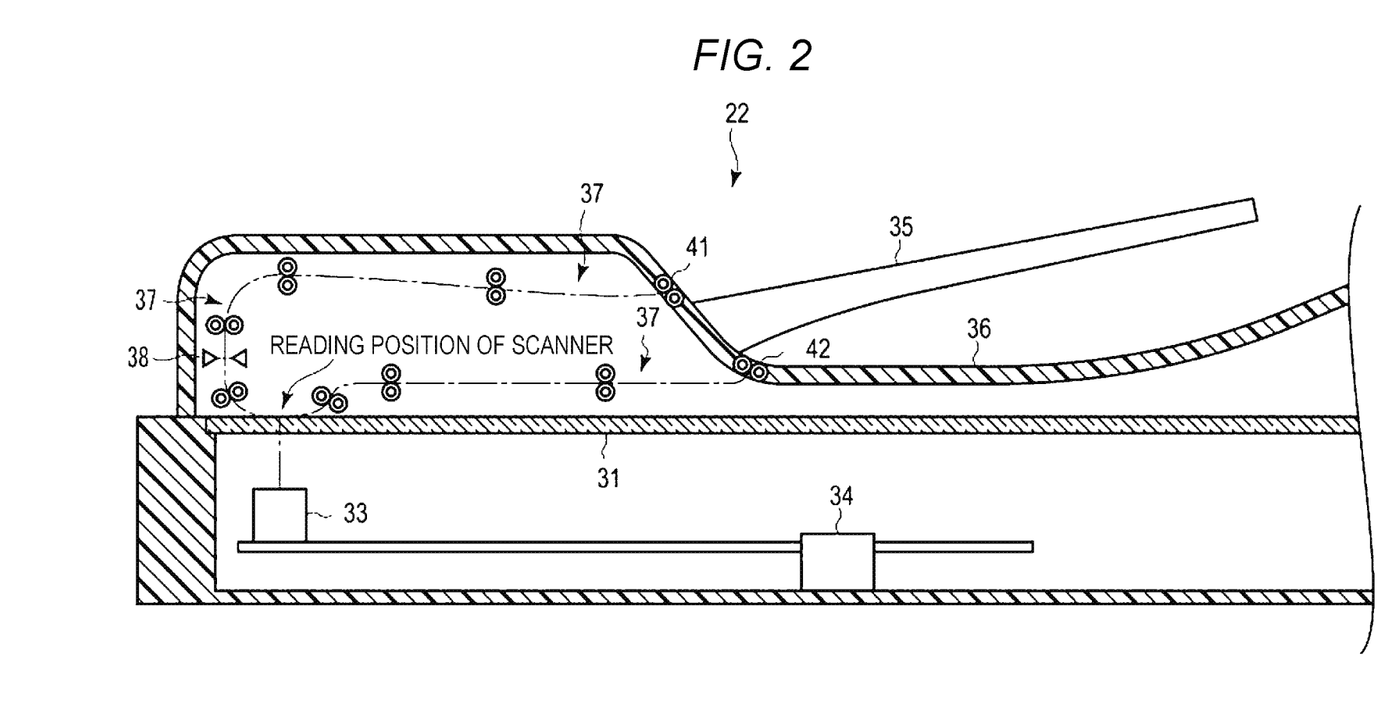
FIG. 2 depicts an image reading unit.

FIG. 2 is schematic diagram of the image reading unit 22.

The image reading unit 22 includes a glass plate 31, a scanner 33, a moving mechanism 34, a paper feeding tray 35, a paper discharging tray 36, a conveyance mechanism 37, and a passage sensor 38.

The document can be placed on an upper surface of the glass plate 31.

The scanner 33 generates an image signal corresponding to reflections of light from the document. The scanner 33 is below the glass plate 31. The scanner 33 includes an image sensor, lighting, and various optical elements to scan the document.

An image sensor is an image capturing element in which a plurality of pixels that convert light into an electric signal are arranged in a line or the like. The electric signal corresponding to an image signal varies in response to light incident on the image sensor. The image sensor outputs the generated image signal. The image sensor is, for example, a charge coupled device (CCD), a complementary metal oxide semiconductor (CMOS), or other image capturing elements. The direction along which the pixels of the image sensor are arranged is referred to as a main scanning direction in this context. A direction parallel to the glass plate 31 surface but orthogonal to the main scanning direction is referred to as a sub-scanning direction.

The lighting supplies light to the document via the glass plate 31. The lighting includes, for example, a light source such as a light emitting diode or a fluorescent lamp and an optical system that applies light generated by the light source to a reading area of the scanner 33. The reading area of the scanner 33 is a region extending along the main scanning direction. The reflected light from the document forms an image on the plurality of pixels of the image sensor.

The moving mechanism 34 moves the scanner 33 in the sub-scanning direction based on the control of the system controller 13.

The paper feeding tray 35 holds document sheets to be read the image reading unit 22.

The paper discharging tray 36 holds document sheets which have already been scanned by the image reading unit 22.

The conveyance mechanism 37 moves a document sheet to be read by the scanner 33 based on the control of the system controller 13. The conveyance mechanism 37 may be referred to as an automatic document feeder (ADF) in some instances. The conveyance mechanism 37 that takes in a sheet from the paper feeding tray 35 from then conveys the sheet past the reading position of the scanner to the paper discharging tray 36. The conveyance mechanism 37 includes a conveyance path along which the sheets travel during the scanning operation. The conveyance path of the conveyance mechanism 37 incorporates a plurality of motors, a plurality of rollers, and a plurality of guides. The motors rotate shafts or the like to rotate the rollers based on the control of the system controller 13. The rollers move the document along the conveyance path. The guides help direct sheets along the conveyance path.

The conveyance mechanism 37 takes in the sheets disposed on the paper feeding tray 35 one by one via an import port 41. The conveyance mechanism 37 conveys the sheets along in the sub-scanning direction past the reading position of the scanner 33, and the discharges the sheet from a discharge port 42 on to the paper discharging tray 36.

The passage sensor 38 detects the passage of the sheet along the conveyance path of the conveyance mechanism 37. The passage sensor 38 optically detects the passage of the sheet. The passage sensor 38 in this example is a pre-read sensor that is positioned to detect the passage upstream of the reading position of the scanner 33. That is, the passage sensor 38 is at position to detect passage on a portion of the conveyance path between the import port 41 and the reading position of the scanner 33. For example, the passage sensor 38 supplies a different signal to the system controller 13 based on whether a sheet is present at the detection position.

The passage sensor 38 is configured, for example, with the combination of a light projector and a light receiver. When the light from the projector is being blocked by the conveyed document, the passage sensor 38 outputs a high (H) signal from the receiver to the system controller 13. Output of a high signal (H) may be referred to as being turned on or in an on state. If the light from projector is incident to the receiver without being blocked by a conveyed document, the passage sensor 38 outputs a low (L) signal from the receiver. Output of a low signal (L) may be referred to as being turned off or in an off state.

The image reading unit 22 configured as described above conveys the document in the sub-scanning direction to pass the reading position of the scanner 33 using the conveyance mechanism 37 and continuously reads the document with the scanner 33. As a result, image signals are output from the scanner 33 on a one line by one line basis. The image reading unit 22 sequentially outputs the image signals to a scanner controller or the like.

Figure 3:
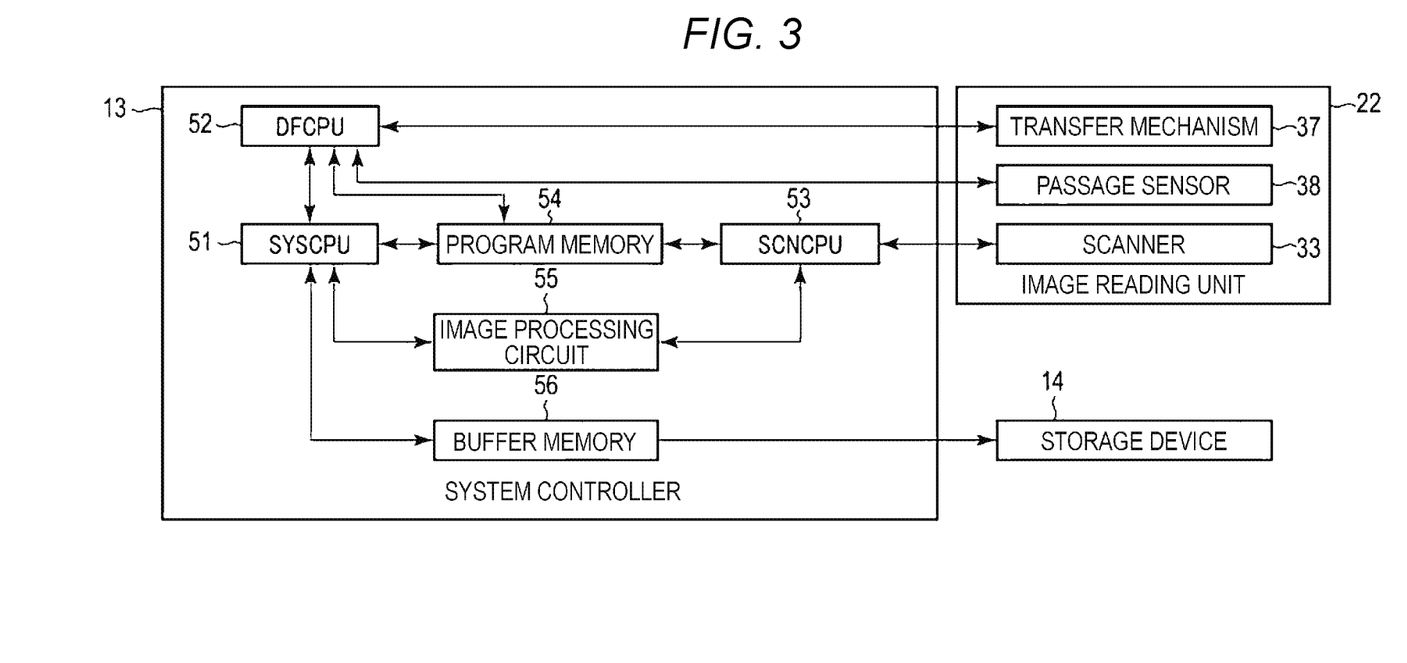
FIG. 3 depicts a system controller.

FIG. 3 is a schematic block diagram of the system controller 13.

As illustrated in FIG. 3, the system controller 13 includes a SYSCPU 51, a DFCPU 52, a SCNCPU 53, a program memory 54, an image processing circuit 55, and a buffer memory 56.

The SYSCPU 51, the DFCPU 52, and the SCNCPU 53 are arithmetic elements, that is, processors, that execute arithmetic processes, respectively. The SYSCPU 51, the DFCPU 52, and the SCNCPU 53 execute various processes based on programs stored in the program memory 54, for example.

The SYSCPU 51 controls various processes in response to operation signals from the operation interface 16, acquisition of a printing job input via the communication interface 12, the image forming process by the image forming unit 20, and storage of data in the storage device 14. The SYSCPU 51 sets parameters for the image processing to the image processing circuit 55. For example, the SYSCPU 51 sets the size of the document (document size) read by the image reading unit 22 or the like.

The DFCPU 52 executes various processes based on the control of the operation of the conveyance mechanism 37 of the image reading unit 22 and detection results of the passage sensor 38 of the image reading unit 22. For example, the DFCPU 52 outputs signals for timing when the scanner 33 reads the image based on the detection result of the passage sensor 38. The DFCPU 52 determines whether the document is present at the detection position of the passage sensor 38 based on the detection result from the passage sensor 38. That is, the DFCPU 52 determines whether a jam in which the document stays in the conveyance path of the conveyance mechanism 37 has occurred.

The SCNCPU 53 controls the operation of the scanner 33 of the image reading unit 22. The SCNCPU 53 controls a process based on the image signal output from the scanner 33. For example, the SCNCPU 53 sequentially sends the image signals output from the scanner 33 to the image processing circuit 55. The SCNCPU 53 controls the image processing of the image processing circuit 55. Specifically, the SCNCPU 53 sets a parameter for an image processing by the image processing circuit 55, executes image processing with respect to the image signals output from the scanner 33, and controls the image processing circuit 55 so that the image data is generated based on the image signals output from the scanner 33.

The program memory 54 is a non-volatile memory that stores programs and data to be used by the programs. The program memory 54 stores the programs respectively executed by the SYSCPU 51, the DFCPU 52, and the SCNCPU 53. The program memory 54 can also store data and the like.

The image processing circuit 55 is an application specific integrated circuit (ASIC) that performs a specific process with respect to the input data and outputs results.

The image processing circuit 55 includes a register (that temporarily stores data) and an image processor that executes the image processing with respect to the image signal. The image processor of the image processing circuit 55 may be referred to as an image processing engine. The register includes, for example, an input register that temporarily stores the input data and an output register that temporarily stores output data. The image signal output from the scanner 33 and input to the image processing circuit 55 is stored in the input register.

The image processing engine of the image processing circuit 55 executes the image processing based on the image signal stored in the input register, generates the image data, and stores the image data in the output register. The image processing circuit 55 sequentially outputs the data stored in the output register to the SYSCPU 51. The image processing circuit 55 may be configured to sequentially output the data stored in the output register to the buffer memory 56.

The image processing circuit 55 executes the image processing based on the parameter(s) for the image processing set by the SYSCPU 51 and the SCNCPU 53. The image processing circuit 55 determines whether the image signal is for a monochrome image or a color image. For example, the image processing circuit 55 determines a data format, a size, or the like of the generated image data based on the parameter(s) for the image processing. Specifically, the image processing circuit 55 is configured so that the image data having formats of PDF, TIFF, JPEG, PNG, BMP, GIF, and the like can be generated based on the image signal.

The buffer memory 56 is a volatile memory that temporarily stores data. The buffer memory 56 temporarily stores the image data generated by the image processing circuit 55 based on the control of the SYSCPU 51.

According to the above configuration, the conveyed document is continuously read by the scanner 33, and the image signal from the scanner 33 for each scan line is input to the image processing circuit 55 via the SCNCPU 53. The image signal input to the image processing circuit 55 is subjected to the image processing by the image processing engine and converted to the image data on a line-by-line basis. The SYSCPU 51 sequentially stores the image data for each line from the image processing circuit 55 in the buffer memory 56. As a result, in the buffer memory 56, the image data for a plurality of lines is synthesized (combined), and the image data for one sheet of the document can be generated. If the scanner 33 normally completes the reading of the document (e.g., no jam or other failure), the SYSCPU 51 outputs the image data in the buffer memory 56 to the storage device 14 and stores the image data in the storage device 14. As a result, the image data for one sheet of the document is stored in the storage device 14.

Next, the operations of the SYSCPU 51, the DFCPU 52, and the SCNCPU 53 in the present embodiment are more specifically described.

The SYSCPU 51 sets the document size in response to an operation input (user selection) or based on a detection result by a sensor provided in the paper feeding tray 35 or the like. The SYSCPU 51 instructs the start of the scanning operation and the document size based on operation input or the like. When the SCNCPU 53 is instructed to start of the scanning operation by the SYSCPU 51, the SCNCPU 53 in turn instructs the DFCPU 52 to start the conveyance of the document and supplies the document size to the DFCPU 52.

Figure 4:
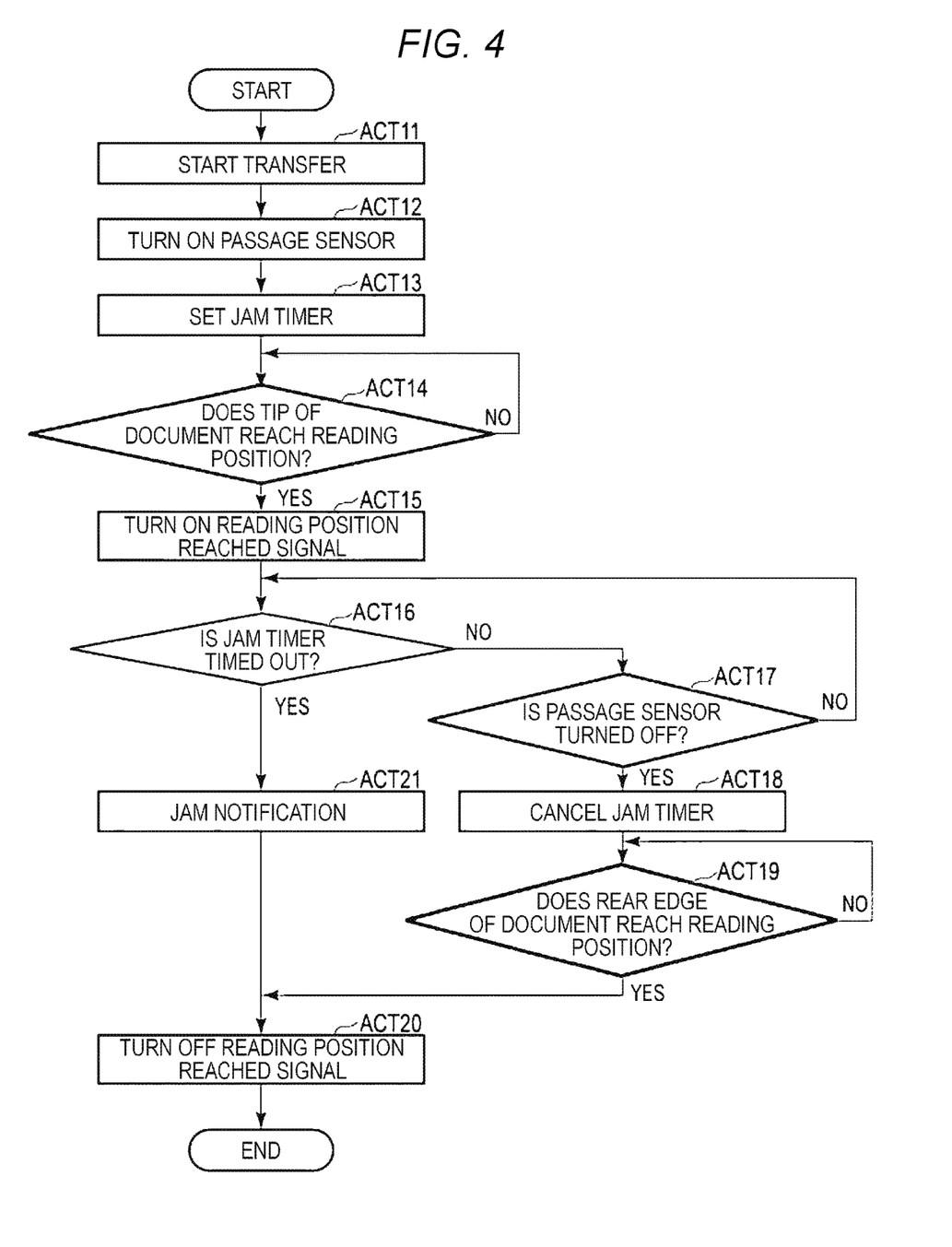
FIG. 4 is flowchart for an operation example of an image forming apparatus according to an embodiment.

FIG. 4 is flowchart for describing an operation example of the DFCPU 52.

If the instruction for the start of the conveyance from the SYSCPU 51 is received by the DFCPU 52, the DFCPU 52 takes in the document of the paper feeding tray 35 from the import port 41 with the conveyance mechanism 37. The document is thus fed into the conveyance path of the conveyance mechanism 37 and the conveyance of the document sheets starts (ACT 11). When the tip (leading end) of the document reaches the detection position of the passage sensor 38, the output signal output from the passage sensor 38 to the DFCPU 52 is set to high (H) (ACT 12).

The DFCPU 52 sets a jam timer based on when by the tip of the document reached the detection position of the passage sensor 38, that is, when detection signal of the passage sensor 38 is set to high (H). The jam timer setting can also be based on document size, a margin amount set in advance, and the conveyance speed of the document (ACT 13). The DFCPU 52 sets, for example, a time obtained by adding a margin to the time from when the document passed through the detection position of the passage sensor 38 as a jam timer. Once the jam timer is set, the DFCPU 52 starts the countdown of the jam timer.

The DFCPU 52 determines whether the leading sheet edge has reached the reading position of the scanner (ACT 14). The DFCPU 52 can calculate when the document should reach the reading position of the scanner 33 based on when the output signal of the passage sensor 38 was set high (H), the conveyance speed of the document, and the distance between the reading position of the scanner 33 and the detection position of the passage sensor 38. For example, the document tip reaching timing is calculated based on a fixed time corresponding to the conveyance speed.

If it is determined that the tip of the document reaches the reading position of the scanner 33 (ACT 14, YES), the DFCPU 52 turns on a reading position reached signal for notifying the SCNCPU 53 that the tip of the document reached the reading position of the scanner 33 (ACT 15). Accordingly, the SCNCPU 53 recognizes when the tip of document reaches the reading position of the scanner 33, and the scanner 33 is to start the reading.

Subsequently, the DFCPU 52 determines whether the jam timer has timed out (ACT 16). That is, after the passage sensor 38 is turned on, the DFCPU 52 determines whether the set jam time of the jam timer has elapsed.

If it is determined that the jam timer is not yet timed out (ACT 16, NO), the DFCPU 52 determines whether the output signal of the passage sensor 38 is low (L) (turned off) (ACT 17). If it is determined that the output signal of the passage sensor 38 is not turned off (ACT 17, NO), the DFCPU 52 is returns to the process of ACT 16.

If it is determined that the output signal of the passage sensor 38 is turned off (ACT 17, YES), the DFCPU 52 cancels the jam timer (ACT 18). If the output signal of the passage sensor is turned off, it is considered that the document has successfully passed through the detection position of the passage sensor 38. Therefore, since it can be determined that a jam did not occur, the DFCPU 52 cancels the jam timer.

The DFCPU 52 then determines whether the rear edge (trailing edge) of the document has reached the reading position of the scanner (ACT 19). The DFCPU 52 calculates when the document rear edge should reach reaches the reading position of the scanner 33 based on when the output signal of the passage sensor 38 was turned off, the conveyance speed of the document, and the distance between the reading position of the scanner 33 and the detection position of the passage sensor 38. For example, the document rear edge reaching time is calculated based on a fixed time set according to the conveyance speed from when the output signal of the passage sensor 38 was turned off.

If it is determined that the rear edge of the document reached the reading position of the scanner (ACT 19, YES), the DFCPU 52 turns off the reading position reached signal, notifies the SCNCPU 53 that the rear edge of the document reached the reading position of the scanner 33 (ACT 20), and ends the process of FIG. 4. The DFCPU 52 turns off the reading position reached signal based on when the passage sensor 38 is turned off, that is, when the rear edge of the document is predicted to pass through the reading position of the scanner 33.

In ACT 16, if it is determined that the jam timer has timed out (ACT 16, YES), the DFCPU 52 notifies the SCNCPU 53 with a jam notification signal indicating that a jam occurred (ACT 21), turns off the reading position reached signal (ACT 20), and ends the process of FIG. 4. That is, after the passage sensor 38 is turned on, if the jam timer elapses without the passage sensor 38 being turned off, the DFCPU 52 determines that a jam occurred. In other words, if the document is still present at the detection position of the passage sensor 38 after a passage time set of the document size, the conveyance speed, and the margin has expired, the DFCPU 52 determines that a jam occurred. The DFCPU 52 notifies the SCNCPU 53 of the jam notification and turns off the reading position reached signal.

Figure 5:
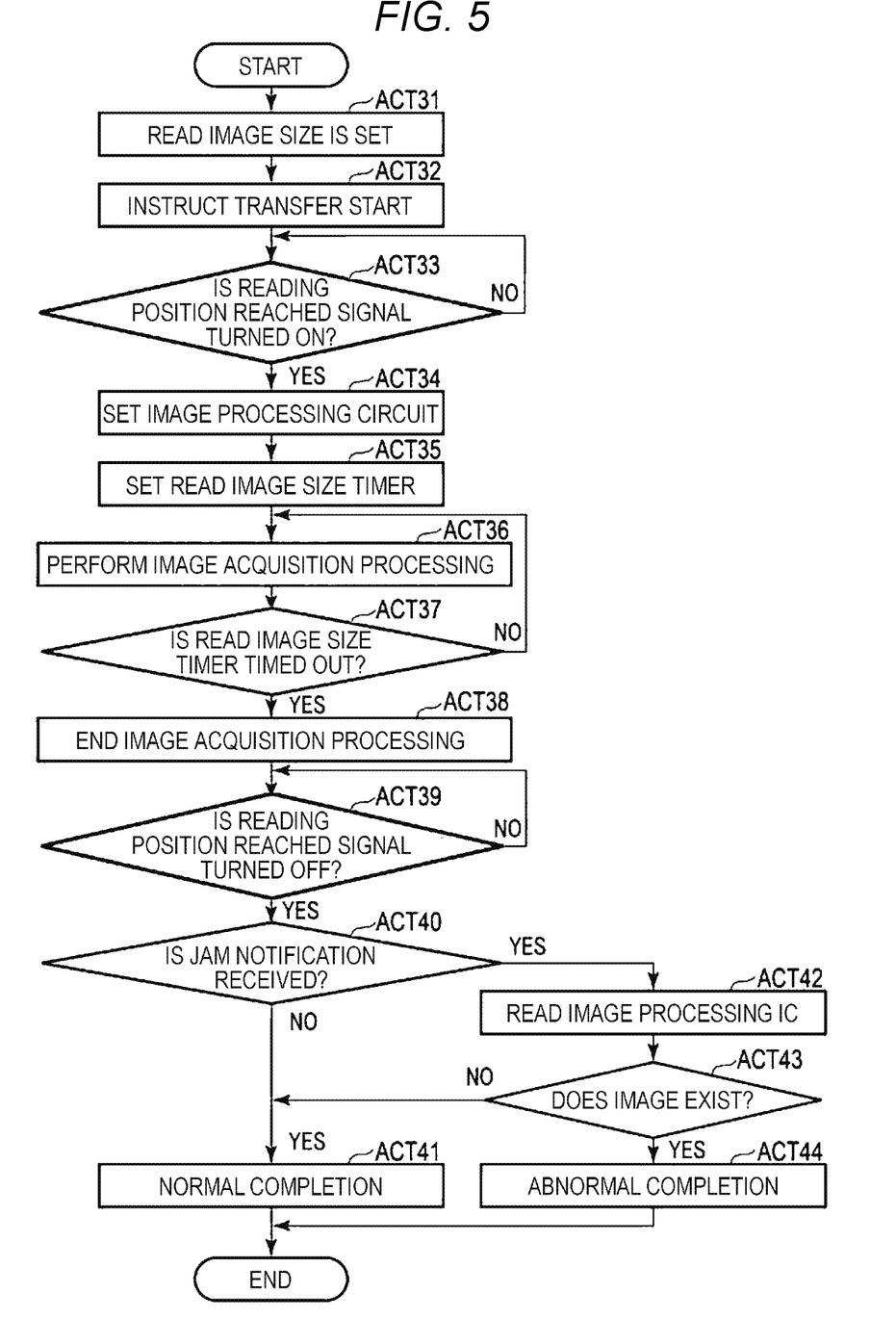
FIG. 5 is a flowchart for an operation example of an image forming apparatus according to an embodiment.

FIG. 5 is a flow chart for describing an operation example of the SCNCPU 53.

The SCNCPU 53 sets the read image size based on the document size instructed from the SYSCPU 51 (ACT 31). The read image size is information for determining how long it should take for the scanner 33 to read the image. The SCNCPU 53 sets the read image size based on the conveyance speed of the document and the document size.

If the SYSCPU 51 instructs the start of the scanning, the SCNCPU 53 instructs the DFCPU 52 of the document size and the start of the conveyance (ACT 32).

Subsequently, the SCNCPU 53 determines whether the reading position reached signal from the DFCPU 52 has been turned on (ACT 33). The SCNCPU 53 waits until the reading position reached signal from the DFCPU 52 is turned on.

When the reading position reached signal from the DFCPU 52 is turned on (ACT 33, YES), the SCNCPU 53 performs various settings in the image processing circuit 55 (ACT 34). For example, if the reading position reached signal from the DFCPU 52 is turned on, the SCNCPU 53 inputs the parameter (s) for image processing to the image processing circuit 55 and sets the image processing circuit 55 to a state in which the image processing can be executed.

The SCNCPU 53 sets the read image size timer based on the read image size (ACT 35). The read image size timer counts the time from when the tip of the document reached the reading position of the scanner 33 until the rear edge of the document is predicted to pass through the reading position of the scanner 33 if the document is normally conveyed. That is, the read image size timer counts the time until the document passes through the reading position of the scanner 33. Once the read image size timer is set, the SCNCPU 53 starts the countdown of the read image size timer.

The SCNCPU 53 executes an image acquisition process with the image processing circuit 55 (ACT 36). The image acquisition process is a process for causing the scanner 33 to start continuous reading of the image signal for each line, sequentially input the image signal for each line to the image processing circuit 55, and generate the image data accordingly. The image processing circuit sequentially outputs the image data for each line which is generated by the image processing via the SYSCPU 51 to the buffer memory 56. For example, when the image acquisition process starts, the SCNCPU 53 notifies the SYSCPU 51 of the storage start. If the notification of the storage start is received, the SYSCPU 51 sequentially stores the image data for each line output from the image processing circuit 55 to the buffer memory 56.

The SCNCPU 53 determines whether the read image size timer has timed out (ACT 37). If it is determined that the read image size timer is not yet timed out (ACT 37, NO), the SCNCPU 53 returns to the process of ACT 36. That is, the SCNCPU 53 continues the image acquisition process until the read image size timer times out.

If it is determined that the read image size timer is timed out (ACT 37, YES), the SCNCPU 53 ends the image acquisition process (ACT 38). That is, the SCNCPU 53 stops the output of the image signal by the scanner 33 and the image processing by the image processing circuit 55. When the image acquisition process ends, the SCNCPU 53 notifies the SYSCPU 51 of the storage end. When the notification of the storage end is received, the SYSCPU 51 ends the storage of image data output from the image processing circuit 55 to the buffer memory 56.

Subsequently, the SCNCPU 53 determines whether the reading position reached signal from the DFCPU 52 is turned off (ACT 39). Until the reading position reached signal from the DFCPU 52 is turned off, the SCNCPU 53 waits for a subsequent process.

If it is determined that the reading position reached signal from the DFCPU 52 is turned off (ACT 39, YES), the SCNCPU 53 determines whether a jam notification was received from the DFCPU 52 (ACT 40).

If it is determined that the jam notification was not received (ACT 40, NO), the SCNCPU 53 notifies the SYSCPU 51 of a normal end (ACT 41) and ends the process of FIG. 5.

If the notification of the normal end is received from the SCNCPU 53, the SYSCPU 51 outputs the image data in the buffer memory 56 to the storage device 14 and stores the image data in a predetermined file format. Accordingly, the image data of the document scanned by the scanner 33 is stored in the storage device 14. In other examples, if the notification of the normal end from the SCNCPU 53 is received, the SYSCPU 51 executes an image forming process with the image forming unit 20 based on the image data in the buffer memory 56.

In ACT 40, if it is determined that a jam notification was received (ACT 40, YES), the SCNCPU 53 performs a reading of the image processing circuit 55 (ACT 42). For example, the SCNCPU 53 transmits a predetermined command to the image processing circuit 55 to read the image, that is, the image data or the image signal, from the image processing circuit 55. After the image processing stops, the SCNCPU 53 reads any image information remaining in the register of the image processing circuit 55.

The SCNCPU 53 determines whether a meaningful image exists in the register of the image processing circuit 55 (ACT 43). For example, a meaningful image in this context is an image for which the contrast calculated from the image is less than a predetermined threshold value set in advance, a non-blank image, anon-background image, or the like. If it is determined that no image at all exists in the register of the image processing circuit 55 when the image process is stopped (ACT 43, NO), the SCNCPU 53 shifts to the process of ACT 41, notifies the SYSCPU 51 of the normal end (ACT 41), and ends the process of FIG. 5. That is, if no image remains in the register of the image processing circuit 55, the SCNCPU 53 transmits a notification to the SYSCPU 51 so that the image data stored in the buffer memory 56 is output as a file or the image forming process is executed by using the image forming unit 20.

If it is determined that an image exists in the register of the image processing circuit 55 (ACT 43, YES), the SCNCPU 53 notifies the SYSCPU 51 of an abnormal end (ACT 44) and ends the process of FIG. 5. That is, if an image remains in the register of the image processing circuit 55, the SCNCPU 53 will determine whether there is an error in the image data in the buffer memory 56 due to a jam.

If the notification of the abnormal end is received from the SCNCPU 53, the SYSCPU 51 does not output the image data in the buffer memory 56 to the storage device 14, but rather outputs, for example, an alert to the display of the display unit 15, and ends the process of FIG. 5.

As described above, the image forming apparatus 1 includes a conveyance mechanism 37 that conveys a document on a conveyance path, a scanner 33 that reads the document at a reading position on the conveyance path to generate an image signal, a buffer memory 56 that stores the image data that is generated based on the image signal, and a passage sensor 38. The passage sensor 38 is upstream of the reading position of the scanner 33 on the conveyance path and serves to detect the passage of the document along the conveyance path.

In such configuration, the system controller 13 calculates a passage prediction time for when the rear edge of the document should reach the reading position of the scanner 33 based on when the tip of the document was detected by the passage sensor 38. For example, if the document is normally conveyed, the DFCPU 52 turns off the reading position reached signal supplied to the SCNCPU 53 in response to the time when the rear edge of the document is expected to reach the reading position of the scanner 33. Accordingly, the SCNCPU 53 can recognize the passage prediction time for the rear edge of the document reaching the reading position of the scanner 33.

The SCNCPU 53 determines whether the image data is output from the buffer memory 56 after the calculated passage prediction time, that is, when the reading position reached signal is turned off. For example, the SCNCPU 53 determines after the passage prediction time calculated by the DFCPU 52 whether a jam notification is has been received. That is, the SCNCPU 53 determines whether the image data may be output from the buffer memory 56 after the passage prediction time predicted by the DFCPU 52 has elapsed.

The image forming apparatus 1 can prevent image data with an error due to a jam from being stored because the SCNCPU 53 determines that the reading normally completed before the jam was detected.

In the above embodiment, it is described that the SYSCPU 51, the DFCPU 52, and the SCNCPU 53 respectively execute programs stored in the program memory 54 to perform various processes, but the present disclosure is not limited thereto. In some examples, a single processor that executes a program or programs stored in the program memory 54 may be configured to realize the various described functions of the SYSCPU 51, the DFCPU 52, and the SCNCPU 53. In other examples, programs may be incorporated into the SYSCPU 51, the DFCPU 52, and the SCNCPU 53 in advance as firmware or the like.

In an above embodiment, it was described that the system controller 13 includes the SYSCPU 51, the DFCPU 52, and the SCNCPU 53, but the present disclosure is not limited thereto. The SYSCPU 51, the DFCPU 52, and the SCNCPU 53 may be disposed at any locations, respectively. For example, the DFCPU 52 may be provided in the image reading unit 22. The SCNCPU 53 may be incorporated in the scanner 33 of the image reading unit 22.

The functions described in the above example embodiments can also be implemented in software of a general purpose computer or the like. Likewise, various combinations of software and hardware may be utilized for implementing the described functions of the embodiments.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a conveyance mechanism configured to convey a document along a conveyance path;
a scanner configured to read an image on the document at a reading position along the conveyance path and generate image signals corresponding to the image;
a buffer memory configured to store image data corresponding to the image signals;
a passage sensor on the conveyance path upstream of the reading position and configured to detect the passage of the document; and
a controller configured to determine whether to output the image data from the buffer memory after the elapsing of a passage prediction time after the leading edge of the document is detected by the passage sensor, the passage prediction time being based on a length of time required in a normal operation for the trailing edge of the document to reach the reading position after the leading edge of the document reaches the passage sensor.

2. The image forming apparatus according to claim 1, wherein the controller is configured to calculate the passage prediction timing based on a sheet size of the document, a distance between the passage sensor and the reading position, and a conveyance speed setting of conveyance mechanism.

3. The image forming apparatus according to claim 1, wherein the controller is configured to:
determine whether a jam has occurred after the elapsing of the passage prediction time,
output the image data from the buffer memory if the jam has not occurred, and
not output the image data from the buffer memory if the jam has occurred.

4. The image forming apparatus according to claim 3, wherein the controller is further configured to output an alert if the jam has occurred.

5. The image forming apparatus according to claim 3, wherein the controller is further configured to:
set a jam timer having a value based on a sheet size of the document and a conveyance speed setting of conveyance mechanism,
start the jam timer when the leading edge of the document is detected by the passage sensor, and
determine that a jam has occurred if the jam timer times out before the trailing edge of the document is detected by the passage sensor.

6. The image forming apparatus according to claim 5, wherein the controller cancels the jam timer when the trailing edge of the document is detected by the passage sensor.

7. The image forming apparatus according to claim 3, further comprising:
an image processing circuit configured to receive the image signals from the scanner and generate the image data based on each image signal from the scanner and output the image data to the buffer memory.

8. The image forming apparatus according to claim 7, wherein the controller is configured to determine whether to output the image data from the buffer memory after a jam occurs based on a reading of the image signals in the image processing circuit after the jam occurs.

9. The image forming apparatus according to claim 8, wherein the controller is configured to not output the image data stored in the buffer memory after a jam has occurred and the reading of image signals in the image processing circuit indicates a meaningful image remains in the image processing circuit.

10. The image forming apparatus according to claim 9, wherein the controller is configured to output the image data stored in the buffer memory after a jam has occurred and the reading of image signals in the image processing circuit indicates no meaningful image is in the image processing circuit.

11. The image forming apparatus according to claim 1, wherein the conveyance mechanism comprises a plurality of driven rollers along the conveyance path.

12. A scanner apparatus, comprising:
an automatic document feeder configured to feed sheets of a document from an input tray one by one to a conveyance path;

a plurality of rollers positioned to convey a sheet along the conveyance path;
a scanner configured to read an image on the sheet at a reading position along the conveyance path and generate image signals corresponding to the image;
a buffer memory configured to store image data corresponding to the image signals;
a passage sensor on the conveyance path upstream of the reading position and configured to detect the passage of the sheet; and
a controller configured to determine whether to output the image data from the buffer memory after the elapsing of a passage prediction time after the leading edge of the sheet is detected by the passage sensor, the passage prediction time being based on a length of time required in a normal operation for the trailing edge of the sheet to reach the reading position after the leading edge of the sheet reaches the passage sensor.

13. The scanner apparatus according to claim 12, wherein the controller is configured to calculate the passage prediction timing based on a sheet size of the sheet, a distance between the passage sensor and the reading position, and a conveyance speed setting of conveyance mechanism.

14. The scanner apparatus according to claim 12, wherein the controller is configured to:
determine whether a jam has occurred after the elapsing of the passage prediction time,
output the image data from the buffer memory if the jam has not occurred, and
not output the image data from the buffer memory if the jam has occurred.

15. The scanner apparatus according to claim 14, wherein the controller is further configured to output an alert if the jam has occurred.

16. The scanner apparatus according to claim 14, wherein the controller is further configured to:
set a jam timer having a value based on a sheet size of the sheet and a conveyance speed setting of conveyance mechanism,
start the jam timer when the leading edge of the sheet is detected by the passage sensor, and
determine that a jam has occurred if the jam timer times out before the trailing edge of the sheet is detected by the passage sensor.

17. The scanner apparatus according to claim 16, wherein the controller cancels the jam timer when the trailing edge of the sheet is detected by the passage sensor.

18. The scanner apparatus according to claim 14, further comprising:
an image processing circuit configured to receive the image signals from the scanner and generate the image data based on each image signal from the scanner and output the image data to the buffer memory.

19. The scanner apparatus according to claim 18, wherein the controller is configured to determine whether to output the image data from the buffer memory after a jam occurs based on a reading of the image signals in the image processing circuit after the jam occurs.

20. The scanner apparatus according to claim 19, wherein the controller is configured to not output the image data stored in the buffer memory after a jam has occurred and the reading of image signals in the image processing circuit indicates a meaningful image remains in the image processing circuit.

* * * * *